United States Patent [19]

Sprague

[11] Patent Number: 4,480,899
[45] Date of Patent: Nov. 6, 1984

[54] TWO DIMENSIONAL ELECTRO-OPTIC MODULATOR AND APPLICATIONS THEREFOR

[75] Inventor: Robert A. Sprague, Saratoga, Calif.

[73] Assignee: Xerox Corporation, Stamford, Conn.

[21] Appl. No.: 309,650

[22] Filed: Oct. 8, 1981

[51] Int. Cl.³ .............................................. G02F 1/01
[52] U.S. Cl. .................................................. 350/356
[58] Field of Search ............. 350/356, 162.12, 162.13, 350/162.14, 162.15, 388; 358/230

[56] References Cited

U.S. PATENT DOCUMENTS

| | | | |
|---|---|---|---|
| 3,517,200 | 6/1970 | Kalman | 350/356 |
| 3,644,017 | 2/1972 | Ploss | 350/356 |
| 3,958,862 | 5/1976 | Scibor-Rylski | 350/356 |
| 4,125,318 | 11/1978 | Scibor-Rylski | 350/356 |
| 4,196,977 | 4/1980 | Scibor-Rylski | 350/356 |
| 4,281,904 | 8/1981 | Sprague et al. | 350/356 |
| 4,367,925 | 1/1983 | Sprague et al. | 350/356 |
| 4,370,029 | 1/1983 | Sprague et al. | 350/356 |
| 4,423,426 | 12/1983 | Kitamura | 350/6.8 |

*Primary Examiner*—Bruce Y. Arnold

[57] ABSTRACT

A two dimensional electro-optic modulator comprises an electro-optic element and a two dimensional planar array of individually addressable electrodes for spatially modulating a light beam along a plurality of transverse axes or for imparting a geometric phase front to the light beam. Such a modulator may be used, for example, (1) in a real time or in a time delay and integration mode as a multigate light valve for (a) electro-optic line printing or (b) optical displays, or (2) in a real time mode as (a) a beam focusing and tracking device for optical memories or (b) an areal input device, a Fourier plane filter, or an image plane correlation mask for optical processing.

2 Claims, 6 Drawing Figures

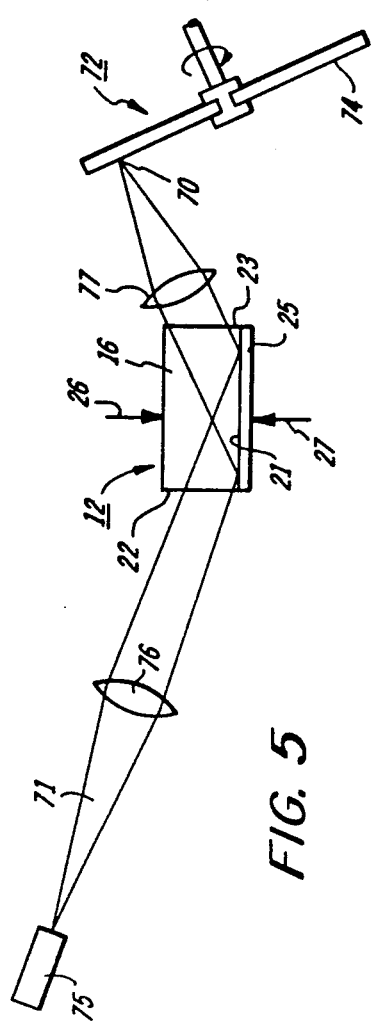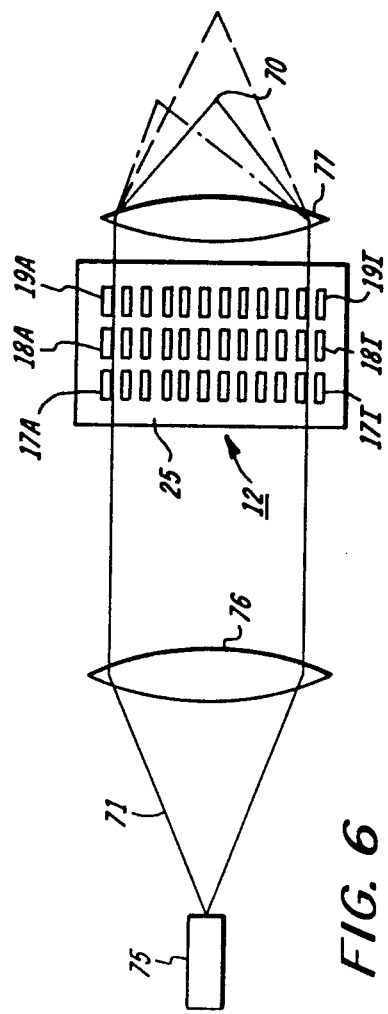

TWO DIMENSIONAL ELECTRO-OPTIC MODULATOR AND APPLICATIONS THEREFOR

FIELD OF THE INVENTION

This invention relates to electro-optic modulators and, more particularly, to two dimensional electro-optic modulators for spatially modulating a light beam along a plurality of transverse axes.

BACKGROUND OF THE INVENTION

As is known, an electro-optic modulator having a plurality of individually addressable electrodes may be employed as a multigate light valve for line printing. See, for example, U.S. Pat. No. 4,281,904 which issued Aug. 4, 1981 on an application of R. A. Sprague et al., for a "TIR Electro-Optic Modulator with Individually Addressable Electrodes". Also see, "Light Gates Give Data Recorder Improved Hardcopy Resolution," Electronic Design, July 19, 1979, pp. 31–32; "Polarizing Filters Plot Analog Waveforms," Machine Design, Vol. 51, No. 17, July 26, 1979, p. 62; and "Data Recorder Eliminates Problem of Linearity," Design News, Feb. 4, 1980, pp. 56–57.

Substantial progress has been made in developing multigate light valves of the foregoing type and in applying them to electro-optic line printing. A commonly assigned U.S. Pat. No. 4,389,659 of R. A. Sprague, which issued June 21, 1983 on an "Electro-Optic Line Printer," shows that an image represented by a serial input data stream may be printed on a standard photosensitive recording medium through the use of a multigate light valve that is illuminated by a more or less conventional light source. That disclosure is of interest primarily because it teaches input data sample and hold techniques for increasing the exposure contrast. Another commonly assigned U.S. Pat. No. 4,396,252 of W. D. Turner, which issued Aug. 2, 1983 on "Proximity Coupled Electro-Optic Devices," teaches that the electrodes and the electro-optic element of a multigate light valve may be physically distinct components which are pressed or otherwise firmly held together to achieve "proximity coupling." Still another commonly assigned U.S. Pat. No. 4,367,925 of R. A. Sprague et al., which issued Jan. 11, 1983 on "Integrated Electronics for Proximity Coupled Electro-Optic Devices," shows that it is relatively easy to make the necessary electrical connections to the many electrodes of a typical proximity coupled multigate light valve if the electrodes are formed by suitably patterning a metallization layer of, say, a VLSI silicon electrode driver circuit. A further copending and commonly assigned United States patent application of W. D. Turner et al., which was filed Sept. 17, 1980 under Ser. No. 187,916 on "Differential Encoding for Fringe Field Responsive Electro-Optic Line Printers," (now U.S. Pat. No. 4,450,459 issued 5/22/84) teaches that the number of electrodes required of a multigate light valve to obtain a given resolution from an electro-optic line printer is reduced by a factor of two if the input data is differentially encoded. Another commonly assigned U.S. Pat. No. 4,415,915 of R. A. Sprague et al., which issued Nov. 15, 1983 on "Multilayer Interleaved Electrodes for Multigate Light Valves," shows that increased electro-optic efficiency and improved resolution may be obtained from a multigate light valve by using two or more layers of interleaved electrodes. Yet another commonly assigned U.S. Pat. No. 4,413,270 of R. A. Sprague, which issued Nov. 1, 1983 on "Multigate Light Valve for Electro-optic Line Printers Having Non-Telecentric Imaging Systems," describes a converging electrode geometry which simplifies the imaging optics that are required to apply such a light valve to electro-optic line printing or the like. Furthermore, another copending and commonly assigned United States patent application of R. A. Sprague on "Non-Uniformity Compensation For Multigate Light Valves" (D/79187) provides a technique for reducing data independent variations in the optical output of a multigate light valve. And still another commonly assigned U.S. Pat. No. 4,437,106 of R. A. Sprague which issued Mar. 13, 1984 on "Method and Means for Reducing Illumination Nulls in Electro-Optic Line Printers" (D/81066) describes approaches that may be taken to minimize the interpixel illumination nulls that electro-optic line printers characteristically exhibit.

It has also been shown that an electro-optic element having individually addressable electrodes may be used as a beam deflector to scan or otherwise move a light beam across an image plane. See a commonly assigned U.S. Pat. No. 4,386,827 of D. R. Scifres et al, which issued June 7, 1983 on an "Electrooptical Scanning Device."

As a general rule, prior electro-optic light valves and beam deflectors have been configured to spatially modulate a light beam along a single transverse axis. This has limited their utility. For example, prior electro-optic line printers have normally required a relatively intense light source, such as a laser, to print at an acceptable rate. Similarly, prior electro-optic beam deflectors have been able to control the lateral position of the deflected beam, but not its longitudinal position.

SUMMARY OF THE INVENTION

In accordance with the present invention, there is a two dimensional electro-optic modulator comprising an electro-optic element and a two dimensional planar array of individually addressable electrodes for spatially modulating a light beam along a plurality of transverse axes. Such a modulator may be used, for example, (1) in a real time or in a time delay and integration mode as a multigate light valve for (a) electro-optic line printing or (b) optical displays, or (2) in a real time mode as (a) a beam focusing and tracking device for optical memories or (b) an areal input device, a Fourier plane filter, or an image plane correlation mask for optical processing.

BRIEF DESCRIPTION OF THE DRAWINGS

Still other features and advantages of this invention will become apparent when the following detailed description is read in conjunction with the attached drawings, in which:

FIG. 5 is a schematic side view of a two dimensional electro-optic modulator as applied to a focus and tracking control system for an optic memory in keeping with still another aspect of this invention; and FIG. 6 is a top view of the focus and tracking system shown in FIG. 5 with the electro-optic element of the modulator removed to better illustrate its individually addressable electrodes.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
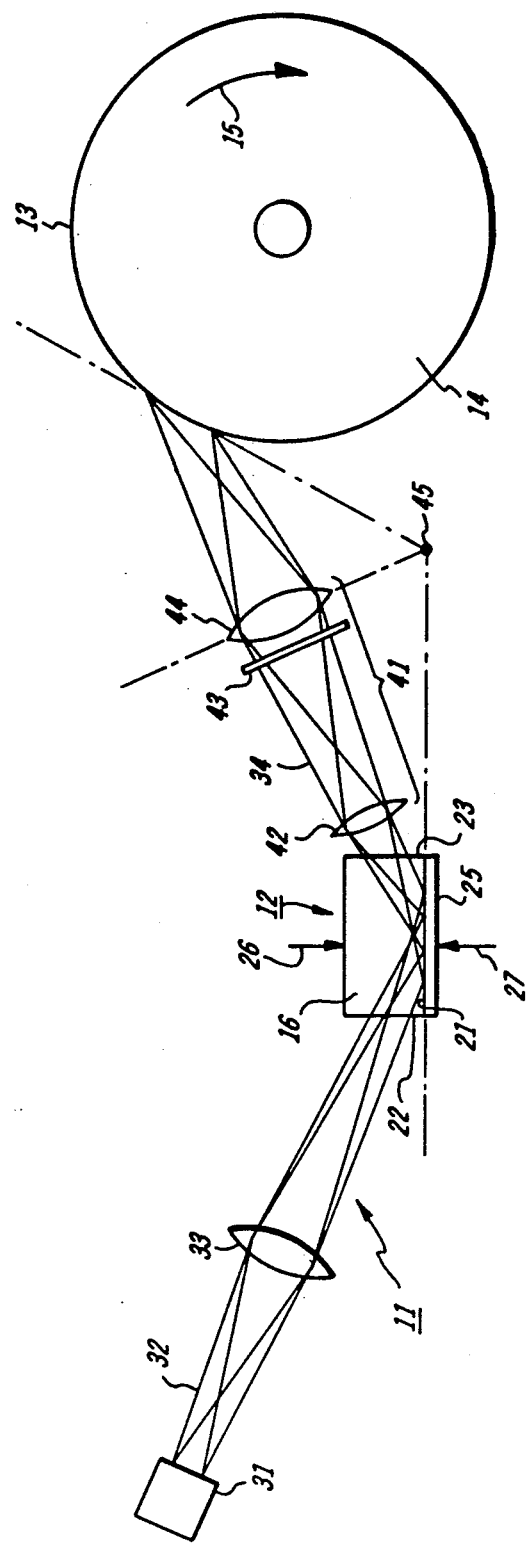
FIG. 1 is a schematic side view showing a two dimensional electro-optic modulator as applied to line printing in keeping with one application of the present invention.
Figure 2:
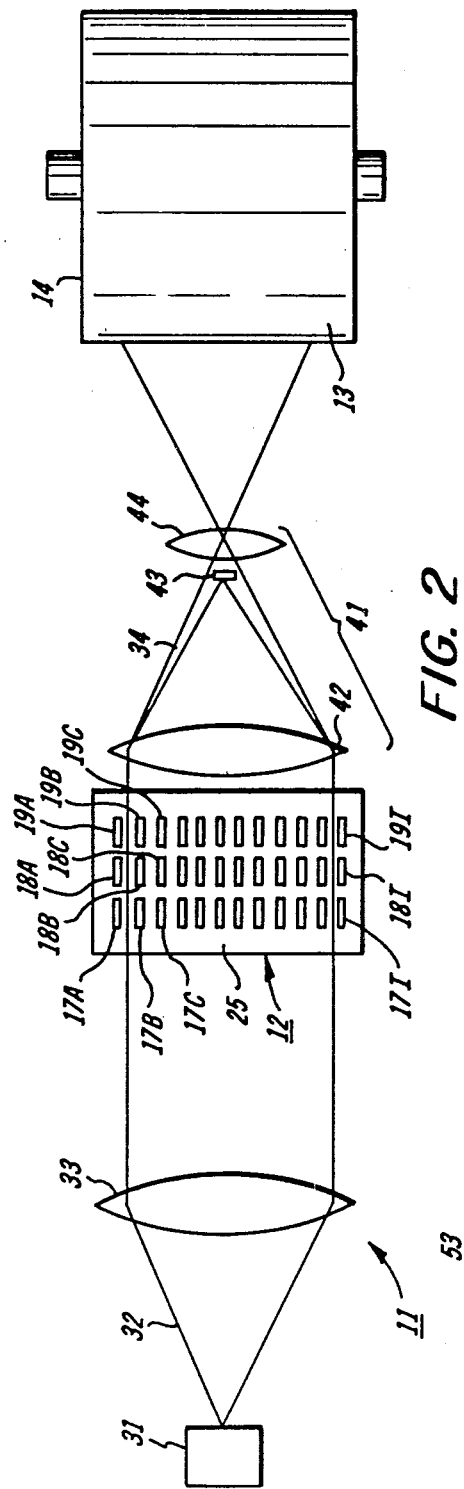
FIG. 2 is a top plan view of the line printer with the electro-optic element of the modulator removed to show the individually addressable electrodes.

Turning now to the drawings, and at this point especially to FIGS. 1 and 2, there is an electro-optic line printer 11 having a two dimensional electro-optic modulator 12 for printing an image on a photosensitive recording medium 13. As shown, the recording medium 13 is a photoconductively coated drum 14 which is rotated (by means not shown) in the direction of the arrow 15. Nevertheless, it will be evident that there are other xerographic and non-xerographic recording media that could be used, including photoconductively coated belts and plates, as well as photosensitive films and coated papers. Thus, in the generalized case, the recording medium 13 should be visualized as being a photosensitive medium which is exposed while advancing in a cross line or line pitch direction relative to the modulator 12.

In accordance with the present invention, the modulator 12 comprises an optically transparent electro-optic element 16 and a two dimensional planar array of individually addressable electrodes 17a–17i, 18a–18i and 19a–19i. The most promising electro-optic materials for such a device presently appear to be LiNbO$_3$ and LiTaO$_3$, but there are others which warrant consideration, including BSN, KDP, KD$^x$P, Ba$_2$NaNb$_5$O$_{15}$ and PLZT.

More particularly, as illustrated, the modulator 12 is operated in a total internal reflection ("TIR") mode. Accordingly, the electro-optic element 16 suitably is a y-cut crystal of, say, LiNbO$_3$ having an optically polished longitudinal reflecting surface 21 extending between opposed, optically polished input and output faces 22 and 23, respectively. Furthermore, to efficiently couple electric fringe fields into the electro-optic element 16, the electrodes 17a–17i, 18a–18i and 19a–19i are supported on or very near the reflecting surface 21 thereof. Indeed, the electrodes 17a–17i, 18a–18i and 19a–19i preferably are deposited on a suitable substrate, such as a VLSI silicon circuit 25, which is pressed or otherwise firmly held against the electro-optic element 16, as indicated by the arrows 26 and 27. The principal advantage of this construction is that the VLSI circuit 25 may be used to make the necessary electrical connections to the electrodes 17a–17i, 18a–18i and 19a–19i.

As a general rule, a rectilinear array of electrodes is preferred. Thus, the electrodes 17a–17i, 18a–18i and 19a–19i are spaced apart widthwise of the electro-optic element 16 (i.e., transversely to its optical axis) in separate rows, while the corresponding electrodes 17a–19a, 17b–19b . . . 17i–19i of each of those rows are spaced apart lengthwise of the electro-optic element 16 (i.e., parallel to its optical axis) in separate columns. In other words, there is a m×n array of electrodes, where m is the number of electrodes/row and n is the number of electrodes/column. Typically, each of the electrodes 17a–17i, 18a–18i and 19a–19i is 1–30 microns wide, and the column-to-column interelectrode gap spacing is 1–30 microns.

Briefly reviewing the operation of the modulator 12 as applied to line printing, it will be seen that there is a source 31, such as a tungsten lamp, for supplying an input light beam 32, and a condensing lens 33 for laterally collimating the input beam 32. The collimated input beam 32 passes through the input face 22 of the electro-optic element 16 and illuminates the reflecting surface 21 over an area which is substantially coextensive with the electrodes 17a–17i, 18a–18i and 19a–19i. Moreover, the input beam 32 is applied to the reflecting surface 21 at nearly a grazing angle of incidence for total internal reflection, thereby providing an output beam 34 which exits from the electro-optic element 16 through its output face 23.

The phase front or the polarization of the output beam 34 is spatially modulated along a plurality of transverse axes in accordance with the data applied to the electrodes 17a–17i, 18a–18i and 19a–19i, respectively. In particular, any voltage drops between laterally adjacent pairs of electrodes, such as the electrodes 17b and 17c, 18b and 18c, or 19b and 19c, create fringe electric fields which penetrate into the electro-optic element 16, thereby producing localized, laterally extending variations in its refactive index.

In the illustrated embodiment it has been assumed that the phase front of the output beam 34 is spatially modulated in accordance with the data applied to the electrodes 17a–17i, 18a–18i and 19a–19i. Accordingly, Schlieren central dark field or bright field imaging optics are used to convert the phase front modulation of the output beam 34 into a correspondingly modulated two dimensional intensity profile and to supply any magnification that may be needed to obtain an image of the desired size. More particularly, as shown, there are central dark field imaging optics 41 comprising a field lens 42, a central stop 43, and an imaging lens 44. The field lens 42 is optically aligned between the output face 23 of the electro-optic element 16 and the stop 43 to focus substantially all of the zero order diffraction components of the output beam 34 onto the stop 43. However, the higher order diffraction components of the output beam 34 in the plane of FIG. 2 scatter around the stop 43 and are collected by the imaging lens 44 which, in turn, focuses them on or near the recording medium 13 to create an image.

Of course, if the input beam 32 is polarized (by means not shown), the polarization of the output beam 34 will be spatially modulated by the light valve 12 in accordance with the data applied to the electrodes 17a–17i, 18a–18i and 19a–19i. In that event, a polarization analyzer (also not shown) may be used to convert the spatial polarization modulation of the output beam 34 into a correspondingly modulated two dimensional intensity profile. Accordingly, to generically cover the alternatives, the phase front or polarization modulation of the output beam 34 will be referred to as "p-modulation" and the read out optics 41 will be described as "p-sensitive imaging optics."

Figure 3:
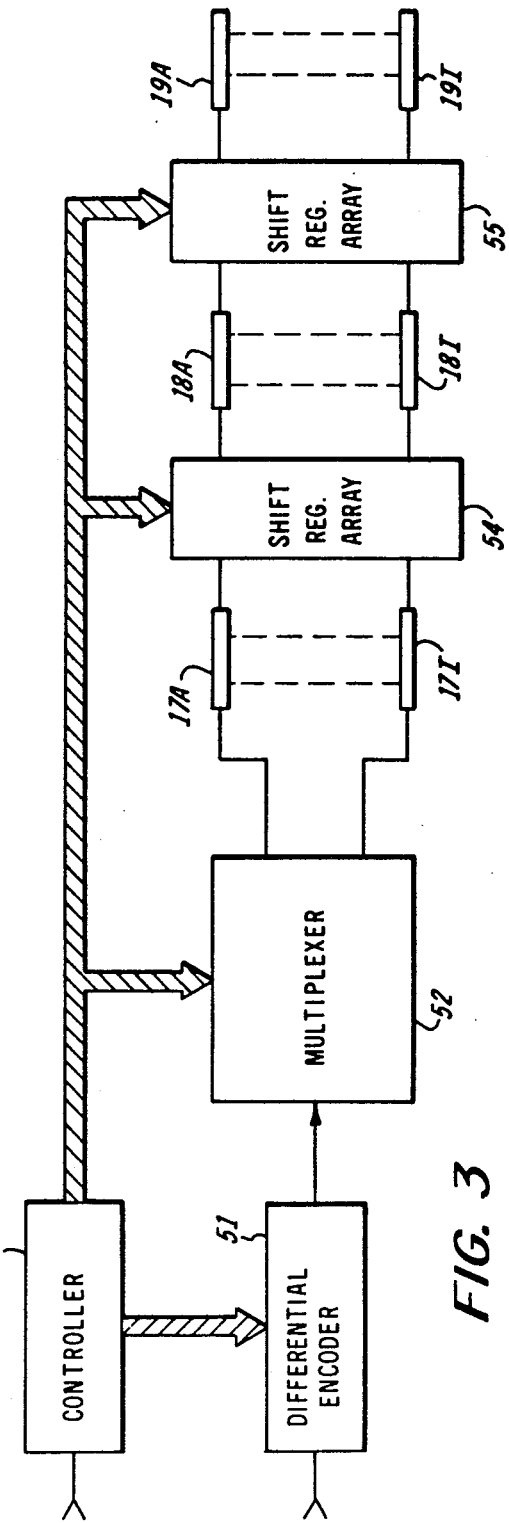
FIG. 3 is a simplified block diagram of a system for applying differentially encoded input data samples to the electrodes of the modulator of shown in FIG. 2 for line printing in a time delay and integration mode.

Referring to FIGS. 2 and 3, it will be seen that each of the electrodes 17a–17i, 18a–18a and 19a–19i is individually addressable. Therefore, to print an image, separate sets of differentially encoded data samples are simultaneously applied to the electrodes 17a–17i, 18a–18i and 19a–19i. Each such sample set represents the picture elements for a respective line of the image. As a matter of definition, each differentially encoded data sample, other than the first sample for each line of image, has a magnitude which differs from the magnitude of the previous differentially encoded sample by an amount corresponding to the magnitude of a particular input data sample. The first differentially encoded sample for each line is referenced to a predetermined potential, such as ground. Thus, when the differentially encoded data samples for separate lines of the image are applied to the electrodes 17a–17i, 18a–18i and 19a–19i, the picture elements for those lines are faithfully represented by the voltage drops between adjacent ones of the electrodes 17a–17i, 18a–18i and 19a–19i, repsectively.

To supply the differentially encoded data samples, raw data samples are serially applied to a differential encoder 51 at a predetermined data rate. The encoder 51 differentially encodes the input samples on a line-by-line basis, and a multiplexer 52 ripples the encoded data samples onto the electrodes 17a–17i at a ripple rate which is matched to the data rate. A controller 53 synchronizes the multiplexer 52 with the encoder 51.

One of the important advantages of the two dimensional modulator 12 as applied to line printing is that a time delay and integration process may be used in applying data to the electrodes, thereby relaxing the requirements on the intensity required of the light source 31. For such a printing process, the differentially encoded samples for each line of the image are sequentially shifted at the line printing rate through shift register arrays 54 and 55, from the electrodes 17a–17i to the electrodes 18a–18i and then to the electrodes 19a–19i. To that end, each of the arrays 54 and 55 comprise a plurality of parallel single stage shift registers, and the differentially encoded data samples are shifted therethrough under the control of the controller 53. Since the data shift rate is matched to the cross line velocity of the recording medium 13, each line of the image is repeatedly reimaged on the recording medium 13 during several successive line times and the several images of any given line are substantially registered with one another.

As will be understood, ground plane electrodes (i.e., not shown, but defined as being electrodes referenced to the same voltage level as the raw input data samples) could be interleaved with the individually addressable electrodes, 17a–17i, 18a–18i and 19a–19i thereby avoiding the need for differential encoding. As a general rule, however, the advantages of reducing the number of electrodes required to achieve a given resolution justify the additional circuitry needed for differential encoding.

Since the two dimensional array of electrodes 17a–17i, 18a–18i and 19a–19i is obliquely tilted with respect to the imaging lens 44, it is impossible to precisely focus the full length of the modulator 12 (i.e., its longitudinal dimension) on the recording medium 13. However, if the so-called Schleinfug condition is satisfied—viz., if the plane of the electrodes 17a–17i, 18a–18i and 19a–19i, the tangential plane of the recording medium 13, and the plane of the imaging lens 36 all intersect at a point 45—a well focused image can be obtained. Indeed, even if the Schleinfug condition is only approximated, a useable image can be provided, particularly if the plane of best focus for the imaging lens 36 is selected to intersect the longitudinal centerline of the electrode array 17a–17i, 18a–18i and 19a–19i, thereby minimizing the out of focus distances which are encountered. Such out of focus distances will of course, cause a small degradation of the image mean transfer function (MTF) for the forward and aft portions of the light valve 12, but optics with a suitably low numerical aperture may be employed to ensure that the out of focus distances are all within the depth of focus of the readout optics 41.

Figure 4:
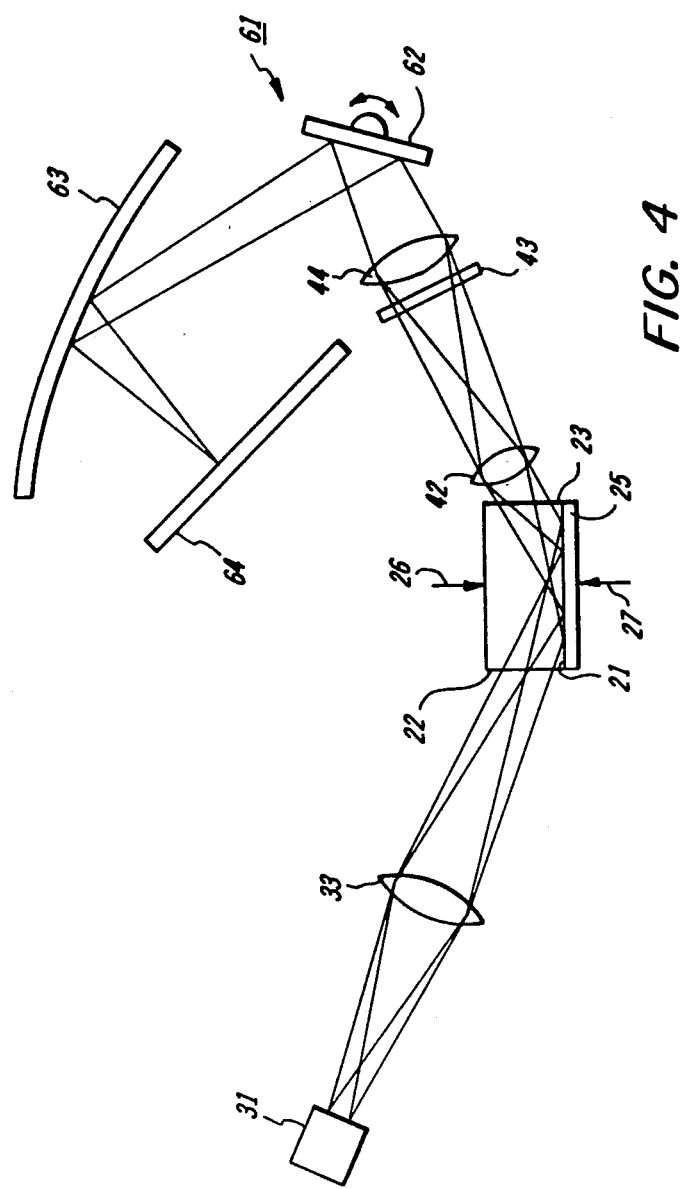
FIG. 4 is a schematic side view showing a two dimensional electro-optic modulator as applied to a projection display system in accordance with another aspect of this invention.

Referring to FIG. 4, it will be seen that the two dimensional modulator 12 may also be employed in a display terminal 61. For this application, galvonometer mirror 62 and a field flattening mirror 63 are optically aligned between the imaging lens 44 and a display device 64 as will be appreciated, the galvonometer mirror 62 cyclically sweeps the intensity modulated light beam in a cross line or line pitch direction relative to the display device 64, while the field flattening mirror 63 maintains a substantially constant congugate distance between the imaging lens and the display device 64. Otherwise, this application is closely related to the above described application of the modulator 12 to line printing and, therefore, like reference numerals have been used to identify like parts. However, it should be noted that the display device 64 may be an active device, such as a light addressable electrophoretic display, or a passive device, such as a rear projection screen. Furthermore, if an active display device is used, it may be viewed directly or it may be projected onto a screen for viewing. In practice, the display terminal 61 would have a suitable refresh memory (not shown), and the display device 64 would be periodically refreshed at a suitable refresh rate. However, those features form no part of the present invention and are commonplace in the display art. Nevertheless, it should be noted that the above described time delay and integration process may be advantageously utilized in display applications for applying data to the electrodes 17a–17i, 18a–18i and 19a–19i of the modulator 12.

Turning to FIGS. 5 and 6, the two dimensional electro-optic modulator 12 may also be utilized to control the longitudinal and lateral positioning of the focal point 70 of a light beam. For example, the modulator 12 may be used in an optical disk drive 72 (shown only in relevant part) to move the focal point 70 of the light beam 71 forward and back and side to side relative to an optical recording media 74 for focus control and tracking control, respectively. Focus control is represented in FIG. 6 by longitudinal movement of the focus 70 for the light beam 71 between its solid line position and its dashed line position, and tracking control is represented by lateral movement of the focus 70 between its solid line position and its dot-dashed line position.

For this application, the light beam 71 is supplied by a point source 75 and may be collimated along both of its transverse axes by a collimating lens 76. The collimated beam 71 is applied to the reflecting surface 21 of the electro-optic element 16 at nearly a grazing angle of incidence to substantially fully illuminate the electrode bounded region thereof (i.e., the portion of the surface 21 which overlies the electrodes 17a–17i, 18a–18i and 19a–19i) and to be totally internally reflected therefrom. Any out of focus condition of the focal point 70 may be represented by a quadractic phase factor and any off track condition thereof may be represented by a linear phase factor. Thus, voltages representing a stepwise approximation of the appropriate quadractic and/or linear phase factor are applied to the individually addressable electrodes 17a–17i, 18a–18i and 19a–19i to produce a spherical and/or tilted wavefront, respectively, on the light beam 71, and the reflected light beam 71 is brought to focus by a focussing lens 77 to produce an optical Fourier transform of focal point correcting phase factor. As shown, the lens 77 is placed in the path of the collimated light beam. However, the beam need not be collimated, and the and the modulator 12 may be anywhere in the optical path ahead of or behind the focussing lens 77. In any event, the phase factor applied to the light beam 71 determines the longitudinal and lateral spatial positioning of its focal point 70 within a limited range. The range is limited because the maximum phase change that the modulator 12 can impart to any point of the the wavefront of the light beam 71 is $2\pi$ radians. To accomodate that limitation, any input voltage which requires a phase change in excess of $2\pi$ radians is reset to a residual level (i.e., a level determined by the amount by which the required phase change exceeds $2\pi$ radians), thereby causing the modulator 12 to simulate a Fresnal lens.

In a somewhat broader sense, it will be appreciated that a diffraction plane embodiment of the invention, such as shown in FIGS. 5 and 6, may be used to input two dimensional signal or reference data for optical data processing. Such data may be applied to the modulator 12 in encoded form, either in differentially encoded form or mixed with a carrier. Alternatively, raw data may be applied if there are ground plane electrodes. As was previously pointed out, an optical Fourier transform of such data is provided by bringing the light beam 71 to focus. Accordingly, a diffraction plane embodiment may be used, for example, as a two dimensional areal input device or as a Fourier plane filter for optical data processing. Furthermore, it will be evident that an image plane embodiment of the invention, such as shown in FIGS. 1 and 2, may be used to input two dimensional reference data for, say, performing an image plane correlation function. Of course, one dimensional signal data may be folded (by means not shown) for two dimensional image plane or diffraction plane optical processing.

CONCLUSION

In view of the foregoing it will now be understood that the two dimensional electro-optic modulator of the present invention has distinct advantages over its one dimensional predecessors as applied to line printing or optical displays and has unique applications to, for example, optical memories and optical data processors.

What is claimed is:

1. An electro-optic modulator for spatially modulating a light beam essentially simultaneously in two dimensions in accordance with input voltages, said modulator comprising
    an electro-optic element, and
    a two dimensional planar array of individually addressable electrodes intimately associated with a reflective surface of said electro-optic element for coupling fringe electric fields into said electro-optic element in response to said input voltages, and
    means for applying a light beam to said modulator at a grazing angle of incidence with respect to the reflective surface of said electro-optic element, said light beam illuminating said surface over an area which is essentially coextensive with said electrode array whereby said light beam is spatially modulated essentially simultaneously in two dimensions in accordance with said input voltages.

2. The electro-optical modulator of claim 1 wherein said electrode array is a rectilinear array, whereby said light beam is spatially modulated essentially simultaneously along a pair of transverse axes in accordance with said input voltages.

* * * * *